United States Patent Office 2,803,524
Patented Aug. 20, 1957

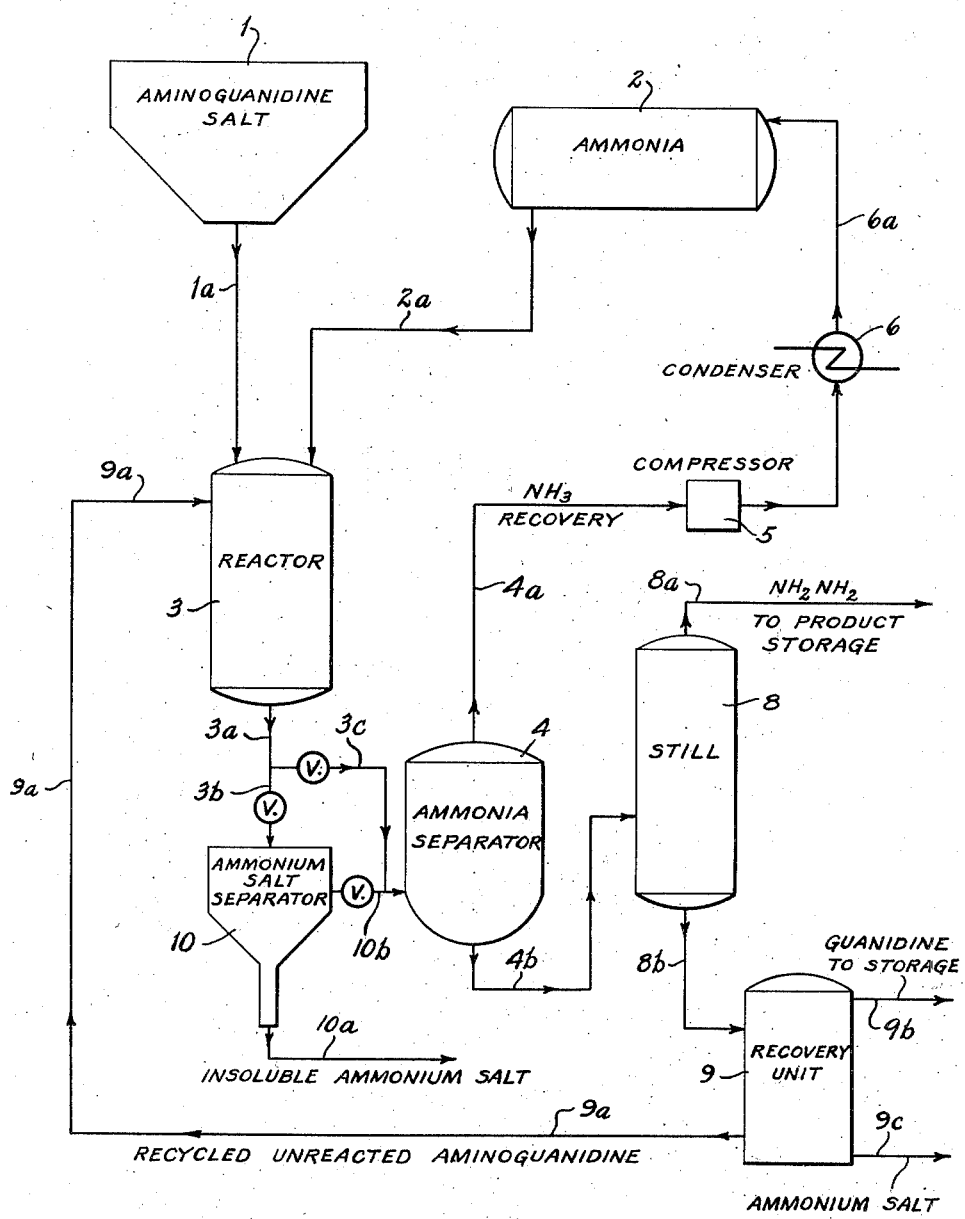

2,803,524

PRODUCTION OF ANHYDROUS HYDRAZINE

Archie John Deutschman, Jr., Columbus, Kans., and Willard Clare Bull, Joplin, Mo., assignors to Spencer Chemical Company, Kansas City, Mo., a corporation of Missouri Application November 19, 1953, Serial No. 393,055

5 Claims. (Cl. 23—190)

This invention relates to the production of hydrazine and more particularly to an improved process for the direct production of hydrazine at substantially less cost than by methods heretofore employed.

Hydrazine and its derivatives possess unique properties which make their use especially desirable and advantageous. For example, hydrazine and its derivatives find advantageous use, either alone or in combination with other chemicals, as highly effective reducing agents in various chemical processes, and in the synthesis of important pyrazalone compounds made by reacting hydrazine with esters of the beta-ketonic acids. Hydrazine also finds advantageous use as a constituent in the compounding of high energy propulsion fuels of unique and powerful properties.

While many of the unique and advantageous uses for hydrazine and its derivatives are generally known and recognized in the chemical industry, these products have heretofore not found extensive application due to their high price, as reflected by high costs of manufacture in accordance with methods presently practiced.

It has been customary in commercial practice to manufacture hydrazine using ammonia or urea and sodium hypochlorite as the essential raw materials. For example, sodium hypochloriate in dilute aqueous solution is mixed with a large excess of ammonia at low temperatures to produce a reaction mixture containing chloramine and unreacted ammonia. The chloramine and ammonia reaction mixture is then readily heated to a temperature in the region of 160° C. to effect completion of the reaction of chloramine and ammonia to form a dilute aqueous hydrazine solution which contains approximately only 2% to 4% hydrazine. To effect even this low conversion to hydrazine, the addition of a glue or gelatin to the reactants is necessary to inhibit the catlytic decomposition of the hydrazine and/or chloramine to nitrogen and ammonium chloride.

It has been suggested that hydrazine may also be produced by the destructive hydrolysis of aminoguanidine by caustic alkalies in aqueous solution. As a result of this hydrolysis, the valuable guanidine nucleus is completely destroyed and ammonia and carbon dioxide by-products are formed, which by-products are of little economic value as compared with the valuable guanidine nucleus destroyed in the process.

Both of the above processes result in the production of a dilute aqueous hydrazine solution. To reduce these dilute aqueous hydrazine solutions to anhydrous hydrazine, hydrated hydrazine of 57 mole percent concentration, or to a more concentrated aqueous hydrazine in form suitable for commercial application, requires extensive and costly evaporation, distillation and chemical treating procedures. Additionally, large amounts of power and heat energy are consumed, most careful supervision and processing control of each step in the operation is necessary to avoid the formation of undesired compounds, and valuable input materials such as caustic and chlorine are not recoverable as useful by-products but converted to materials which are discarded as waste.

In accordance with this improved process, substantially anhydrous hydrazine can be produced using aminoguanidine or an aminoguanidine salt and excess ammonia as the reacting materials. The aminoguanidine or its salt is reacted with excess ammonia until equilibrium is reached, the ammonia also serving to solubilize the aminoguanidine to form a readily flowable reaction mixture. Upon completion of the reaction, the reaction mixture contains essentially hydrazine, unreacted aminoguanidine, ammonia and guanidine. The ammonia may be flashed off and recovered for reuse, the hydrazine recovered from the reaction mixture by distillation procedures, and the unreacted aminoguanidine and guanidine constituents separated as by differential solubility procedures. The unreacted aminoguanidine may then be recycled for reuse in the process. In addition, the guanidine may be converted to aminoguanidine suitable for reuse in the process.

The process of this invention is admirably adapted for the continuous commercial production of hydrazine, inasmuch as the valuable guanidine nucleus is not destroyed in the process and can be reconverted to aminoguanidine, one of the reactant materials, or utilized as a by-product. This improved process is relatively simple in operation, and permits the direct production of substantially anhydrous hydrazine at moderate cost and with relatively high conversion yields, and also makes unnecessary the extensive and costly treating procedures heretofore required for the dehydration of the highly aqueous hydrazine solution produced by prior art procedures.

Other objects and advantages of this invention will become apparent as the disclosure proceeds.

The basic reactions by which the process of this invention proceeds are illustrated by the equations as follows:

I. Aminoguanidine to hydrazine:

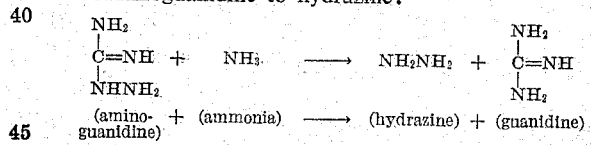

II. Aminoguanidine salt to hydrazine:

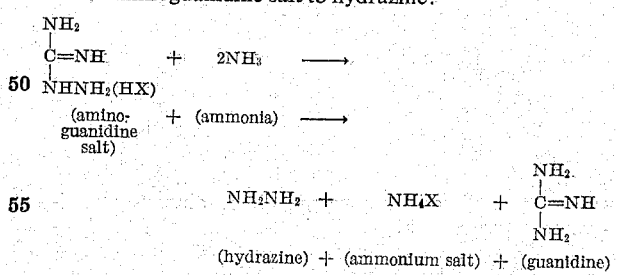

(In the above equation (HX) represents an acid.)

In accordance with the process of this invention, a substantially anhydrous aminoguanidine base, as exemplified in Equation I, or a selected aminoguanidine salt, as exemplified in Equation II, is reacted with substantially anhydrous liquid ammonia in the proportion of one mole of aminoguanidine to from ten to twenty moles of ammonia at a reaction temperature of from 50° C. to 200° C., and preferably at a temperature in the order of 75° C. to 150° C. The reaction may be carried out in an autoclave or reactor constructed to withstand the pressure of the reaction and the reaction permitted to continue until approximate equilibrium conditions are reached. The excess ammonia in the reaction mixture, in addition to taking an important part in the reaction, also serves to solubilize the aminoguanidine and provides a readily flowable reaction mixture in a manner to permit convenient and continuous flow processing of the input material. Additionally, the solubilizing effect of ammonia on aminoguanidine permits the use of substantially anhydrous aminoguanidine or aminoguanidine salt as input material, and thus permits direct production of substantially anhydrous hydrazine substantially free of water or other fluidizing constituents.

Where the aminoguanidine base is used as input material, the reaction mixture as withdrawn from the autoclave will contain substantially anhydrous hydrazine, excess or unreacted ammonia, some unreacted aminoguanidine and substantially one mole of guanidine for each mole of hydrazine formed.

Where a selected aminoguanidine salt is used as starting material, the reaction mixture will contain an ammonium salt constituent in addition to the substantially anhydrous hydrazine, unreacted ammonia, unreacted aminoguanidine and regenerated guanidine.

The valuable guanidine nucleus is thus not destroyed or modified during the reaction, but can readily be recovered as a valuable by-product, with substantially no input aminoguanidine broken down into ammonia, carbon dioxide or other material of substantially less or little value. The guanidine removed as a by-product from the reaction mixture in the practice of this process, is a highly valuable by-product with numerous end uses, and if desired, can be reconverted to aminoguanidine for reuse in the process by nitrating the guanidine with nitric acid to produce nitroguanidine, followed by reduction or hydrogenation of the nitroguanidine to aminoguanidine.

Any of the customary salts of aminoguanidine may be used as starting material in this process. Aminoguanidine salts which may find the most practical and economic application as input material may be given as the bicarbonate, sulfate, phosphate, chloride and acetate salts of aminoguanidine. While aminoguanidine salts such as the oxalate, fluoride and bromide salts may also be used, they are generally more costly to produce and accordingly less economically desirable as input material. While other salts of aminoguanidine, such as the perchloric and nitrate salts may be used, such aminoguanidine salts present definite explosion hazards in handling and processing hydrazine, and for this reason are less desirable as input material than the first mentioned salts.

The reaction mixture, as removed from the autoclave upon completion of the reaction to equilibrium conditions, may be conducted to an ammonia separator where the unreacted ammonia may be flashed off and then recompressed and recondensed for reuse in the process as input material. By suitable distillation of the reaction mixture a substantially anhydrous hydrazine may then be recovered therefrom. The hydrazine can be distilled off as an overhead product at approximately 113° C. at atmospheric pressure and substantially pure anhydrous hydrazine thus directly recovered. It is obviously preferable to carry out the distillation operations at the lowest effective pressure and corresponding reduced temperature to minimize hydrazine decomposition.

After recovery of the hydrazine the unreacted aminoguanidine and guanidine formed in the process, can be separated by known separation procedures into substantially pure aminoguanidine and guanidine which provide valuable by-products or recycle constituents.

As an exemplification of the commercial practice of this process, the accompanying schematic flow diagram illustrates the flow of input materials through the processing system in a manner to recover the desired end product and by-products. As indicated in the flow diagram, substantially anhydrous aminoguanidine or a selected anhydrous salt of aminoguanidine used as a starting material, is transported from supply vessel 1 through line 1a into an autoclave or reaction vessel 3. Liquid anhydrous ammonia is run from supply tank 2 through line 2a into the reaction vessel 3 in the proportions of approximately ten to twenty moles of ammonia to one mole of aminoguanidine. These starting materials are thoroughly mixed and heated in the reaction vessel 3 to a temperature of from 50° C. to 200° C., with an optimum temperature in the order of 75° C. to 150° C. The vessel 3 is so constructed as to withstand the pressure generated at the operating temperature. As the reaction approaches equilibrium a mixture is formed comprising substantially anhydrous hydrazine, with equal molar quantities of guanidine, leaving some unreacted aminoguanidine and unreacted ammonia in the mixture.

When the major part of the aminoguanidine has reacted with the ammonia to form hydrazine and guanidine, and after equilibrium conditions have been reached, the reaction mixture may be withdrawn from the reaction vessel 3 and run through lines 3a and 3c into a still or ammonia separator 4, where any remaining unreacted ammonia may be flashed off and recovered in overhead line 4a. The recovered ammonia may then be recompressed in compressor 5, condensed in an externally cooled condenser 6, and returned as by line 6a to the ammonia tank 2 for recycle and reuse. The first reaction mixture, following removal of the ammonia, and comprising anhydrous hydrazine, guanidine and aminoguanidine can then be drawn off from the ammonia separator 4 through line 4b.

Various procedures may thereafter be employed to separate the hydrazine component of this reaction mixture from the guanidine and unreacted aminoguanidine components. Hydrazine in substantially pure form may be separated from the guanidine and unreacted aminoguanidine by simple distillation procedures. For example, the reaction mixture may be withdrawn from the ammonia separator 4 through line 4b and then conducted to distillation equipment 8 where substantially pure anhydrous hydrazine may be recovered as an overhead product by line 8a, leaving the guanidine and unreacted aminoguanidine for further separation. To insure recovery of substantially anhydrous hydrazine, and avoid material decomposition of the unreacted aminoguanidine, it is desirable to carry out the distillation operation at a temperature not substantially higher than 150° C. The guanidine and aminoguanidine may be withdrawn as bottoms product to separator equipment or a recovery unit 9 as by line 8b. The unreacted aminoguanidine may be withdrawn from the recovery unit 9 as by line 9a for return to reactor 3, and the guanidine withdrawn from recovery unit 9 as by line 9b as valuable by-product for conversion to other uses, or for uses in the formation of aminoguanidine input material.

Where a selected salt of aminoguanidine is used as the input material, the reaction mixture withdrawn from the reactor 3 and ammonia separator 4 would contain an ammonium salt in addition to the hydrazine, guanidine and unreacted aminoguanidine. Where the ammonium salt is formed is relatively insoluble in ammonia, as for example, ammonium carbonate and ammonium sulfate, such salts may be readily removed as by decantation, filtration or centrifugation in a salt separator 10 which may be placed in branch line 3b. If the ammonium salt as formed in the reactor 3 is relatively soluble in ammonia, such ammonium salt may be separated from the guanidine and aminoguanidine and recovered by suitable separation procedures associated with the recovery unit 9.

From the above disclosure it will be appreciated that this process permits the use of a substantially anhydrous aminoguanidine base or salt as selectively desired with the direct production of substantially anhydrous hydrazine, and without the addition of an aqueous or any other fluidizing agent except the liquid ammonia, which ammonia takes an important part in the reaction and solubilizes the input aminoguanidine. Thus by this process the difficulties heretofore encountered in the extraction of the hydrazine from a highly fluid or aqueous solution are obviated. Additionally, the excess liquid ammonia solubilizes the substantially dry aminoguanidine input to provide a relatively flowable reaction mixture which permits the application of continuous processing techniques to this process.

It will be appreciated, however, that in the event a hydrated hydrazine, or a hydrazine containing any desired percentage of water or other fluid, is desired as the end product, such fluid can be easily added to the anhydrous hydrazine produced in the process without carrying the water or fluid through the process which creates serious problems in the recovery of the hydrazine. Additionally, any selected salt of hydrazine may be made as desired from the anhydrous hydrazine produced in the process.

While certain embodiments of this improved process have been shown and described to illustrate the broad aspects of this invention, it will be understood that various modifications and changes may be made in this process, as indicated to those skilled in the art by the end product desired, the reaction conditions created, the raw materials used, and the attainment of desirable economies in operation, without departing from the spirit of this invention.

What is claimed is:

1. A process for producing substantially anhydrous hydrazine which includes, mixing a substantially anhydrous compound selected from the group consisting of aminoguanidine and its salts with anhydrous liquid ammonia in the mole ratio of one mole of compound to more than ten moles of ammonia at a reaction temperature in the range of 75° C. to 175° C. to produce a reaction mixture containing anhydrous hydrazine and guanidine, and thereafter separating the anhydrous hydrazine and guanidine from the reaction mixture.

2. A process for producing substantially anhydrous hydrazine which includes, mixing a substantially anhydrous compound selected from the group consisting of aminoguanidine and its salts with anhydrous liquid ammonia in the mole ratio of one mole of compound to more than ten moles of ammonia at a reaction temperature in the range of 75° C. to 175° C. to produce a reaction mixture containing anhydrous hydrazine and guanidine, removing the excess ammonia and thereafter separately recovering the anhydrous hydrazine and guanidine from the remainder of the reaction mixture.

3. A process for producing substantially anhydrous hydrazine which includes, mixing substantially anhydrous aminoguanidine with a stoichiometric excess of anhydrous liquid ammonia, reacting the mixture at a temperature in the range of 75° C. to 175° C. to provide a first reaction mixture, removing the unreacted ammonia, and distilling said reaction mixture to recover substantially anhydrous hydrazine as an overhead product leaving guanidine and unreacted aminoguanidine as a bottoms product.

4. A process for producing substantially anhydrous hydrazine which includes, mixing a substantially anhydrous aminoguanidine salt with substantially anhydrous liquid ammonia in excess of the stoichiometric amount, reacting the mixture at a reaction temperature in the range of 50° C. to 200° C. to provide a reaction mixture, and thereafter removing from said reaction mixture the unreacted ammonia fraction, the formed salt fraction, and the formed hydrazine fraction in substantially anhydrous form.

5. A process for producing hydrazine which includes, mixing a substantially anhydrous aminoguanidine salt with anhydrous liquid ammonia in the mole ratio of not less than ten moles of ammonia per mole of aminoguanidine salt, reacting the mixture at a reaction temperature in the range of 50° C. to 200° C., separating any ammonium salt insoluble in the anhydrous liquid ammonia from the reaction mixture, separating unreacted ammonia from the reaction mixture, and thereafter separating the resultant anhydrous hydrazine from the remainder of the reaction mixture by distillation.

References Cited in the file of this patent

UNITED STATES PATENTS 1,417,369     Davis _____ May 23, 1922

FOREIGN PATENTS 6,786     Great Britain _____ 1891

OTHER REFERENCES

J. W. Mellor's "Modern Inorganic Chemistry," page 657; new impression of 8th ed., January 1935; Longmans, Green and Co., N. Y.